(12) United States Patent
Xiao et al.

(10) Patent No.: US 9,781,316 B2
(45) Date of Patent: Oct. 3, 2017

(54) MULTI-FOCAL LENGTH RANGE IMAGE CAPTURING DEVICE

(71) Applicant: HTC Corporation, Taoyuan (TW)

(72) Inventors: Bo-Wen Xiao, Taoyuan (TW); Ming-Tien Lin, Taoyuan (TW); Huan-Hsin Li, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/967,393

(22) Filed: Dec. 14, 2015

(65) Prior Publication Data

US 2017/0171437 A1    Jun. 15, 2017

(51) Int. Cl.
*H04N 5/225* (2006.01)
*H04N 5/232* (2006.01)

(52) U.S. Cl.
CPC ....... *H04N 5/2253* (2013.01); *H04N 5/23212* (2013.01)

(58) Field of Classification Search
None
See application file for complete search history.

(56) References Cited

U.S. PATENT DOCUMENTS

| | | | | |
|---|---|---|---|---|
| 5,365,297 A | * | 11/1994 | Arimoto | G02B 7/28 396/76 |
| 7,116,364 B2 | * | 10/2006 | Battles | H04N 5/23296 348/240.1 |
| 2009/0244312 A1 | * | 10/2009 | Nakagawa | H04N 5/23219 348/222.1 |
| 2014/0218590 A1 | * | 8/2014 | Nunnink | G01M 11/0228 348/345 |

FOREIGN PATENT DOCUMENTS

TW    M392637    11/2010

OTHER PUBLICATIONS

"Office Action of Taiwan Counterpart Application", issued on Aug. 30, 2016, p. 1-p. 6.

* cited by examiner

*Primary Examiner* — James Hannett
(74) *Attorney, Agent, or Firm* — Jianq Chyun IP Office

(57) ABSTRACT

A multi-focal length range image capturing device including a device body, an image capturing circuit, and a processing circuit is provided. The image capturing circuit performs image capturing based on a focal length setting value and generates an image signal. The processing circuit controls the image capturing circuit to be operated in one of plural image capturing modes. When the image capturing circuit is operated in a first image capturing mode, the image capturing circuit sets a focal length range thereof to a first preset focal length range, so as to select the focal length setting value within the first preset focal length range. When the image capturing circuit is operated in a second image capturing mode, the image capturing circuit sets the focal length range to a second preset focal length range, so as to select the focal length setting value within the second preset focal length range.

12 Claims, 7 Drawing Sheets

MULTI-FOCAL LENGTH RANGE IMAGE CAPTURING DEVICE

BACKGROUND OF THE INVENTION

Field of the Invention

The invention relates to an image capturing device, and more particularly, to a multi-focal length range image capturing device.

Description of Related Art

With advancements in medical and electronic information technologies, developments for various optical detecting apparatuses and medical image capturing devices including an endoscope for entering the human body to facilitate detection of diseases (e.g., otoscope, rhinoscope or laryngoscope) or a body surface detection scope for externally observing body surface of patient (e.g., skin scope or eye detection scope) are also gradually getting mature.

Each of the medical image capturing devices may have different focal length requirements and hardware configurations for different application environments and targets. Accordingly, in existing conventional detecting methods, different image capturing devices are often required to capture internal or external images from different parts of the human body.

Other than that, the medical image capturing devices (e.g., the endoscope or the body surface detection scope) are also more complex in operations, large in size and high in price. Therefore, the existing medical image capturing devices are mostly applied in medical institutions or health care centers but hard to be popularized in general household.

SUMMARY OF THE INVENTION

The invention relates to a multi-focal length range image capturing device, which is capable of solving the problems mentioned in Description of Related Art.

The multi-focal length range image capturing device of the invention includes a device body, an image capturing circuit, and a processing circuit. The image capturing circuit is disposed in the device body and configured to perform image capturing based on a focal length setting value and accordingly generate an image signal. The processing circuit is disposed in the device body, coupled to the image capturing circuit, and configured to control operations of the image capturing circuit so as to output an image according to the image signal. The processing circuit controls the image capturing circuit to be operated in one of a plurality of image capturing modes according to a switch triggering signal. When the image capturing circuit is operated in a first image capturing mode among the image capturing modes according to the switch triggering signal, the image capturing circuit sets a focal length range thereof to a first preset focal length range to select the focal length setting value within the first preset focal length range. When the image capturing circuit is operated in a second image capturing mode among the image capturing modes according to the switch triggering signal, the image capturing circuit sets the focal length range to a second preset focal length range to select the focal length setting value within the second preset focal length range.

Based on the above, the invention proposes a multi-focal length range image capturing device. The user can easily realize the image capturing in various focal length ranges based on requirements of the application scenarios simply by using one single device. Accordingly, the user no longer need to use different hardware devices (e.g., otoscope and laryngoscope and skin scope) for capturing the internal images or the external images from different parts of the human body, such that the convenience in use of capturing the internal images of the human body may be improved for the user accordingly. Further, the switching state of the mode switch of the present application can be switched in response to different application scenarios through a specific hardware configuration of the multi-focal length range image capturing device. Therefore, the image capturing circuit can automatically adjust the image capturing mode according to the switch triggering signal indicating the different types of the switching state based on the different application scenarios. As a result, the user no longer need to additionally and manually switch the mode switch, so that convenience in use of the multi-focal length range image capturing device may be improved for the user and the multi-focal length range image capturing device may also be widely applied in general household more easily.

To make the above features and advantages of the present disclosure more comprehensible, several embodiments accompanied with drawings are described in detail as follows.

DESCRIPTION OF THE EMBODIMENTS

Figure 1:
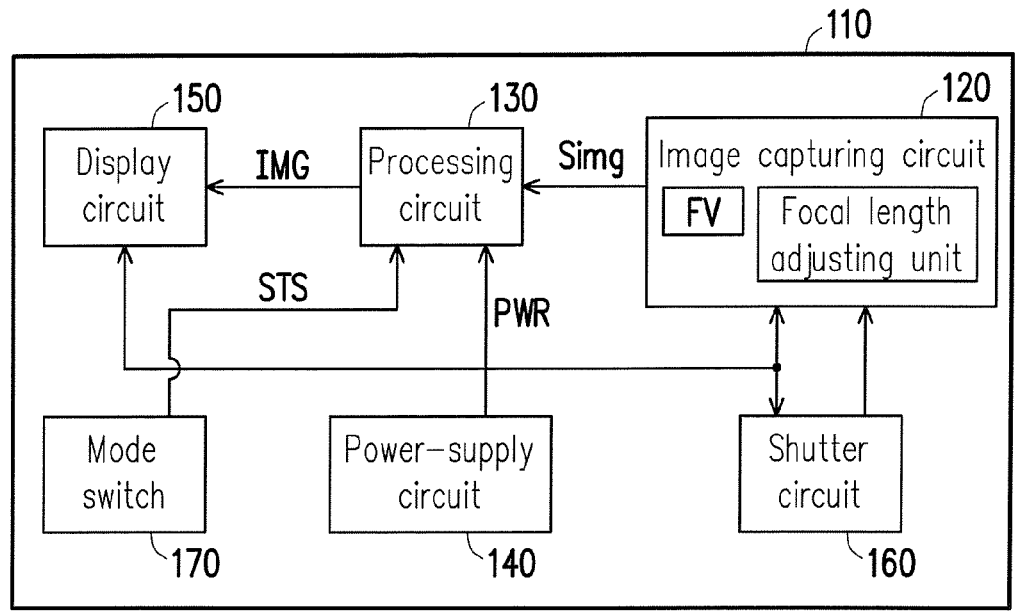
FIG. 1 is a schematic block diagram of a multi-focal length range image capturing device according to an embodiment of the invention.

In order to make content of the present disclosure more comprehensible, embodiments are described below as the examples to prove that the present disclosure can actually be realized. In the following embodiments, wordings used to indicate directions, such as "up," "down," "front," "back," "left," and "right", merely refer to directions in the accompanying drawings. Therefore, the directional wording is used to illustrate rather than limit the invention. Moreover, elements/components/steps with same reference numerals represent same or similar parts in the drawings and embodiments.

The present disclosure proposes a multi-focal length range image capturing device capable of performing image capturing by switching between different focal length ranges according to user application to integrate various image capturing devices (e.g., otoscope, laryngoscope, etc.) together, which is applicable on medical or physical condition detections for capturing body images (e.g., in-ear images, oral cavity images, etc.) from different parts of the user.

Figure 3A:
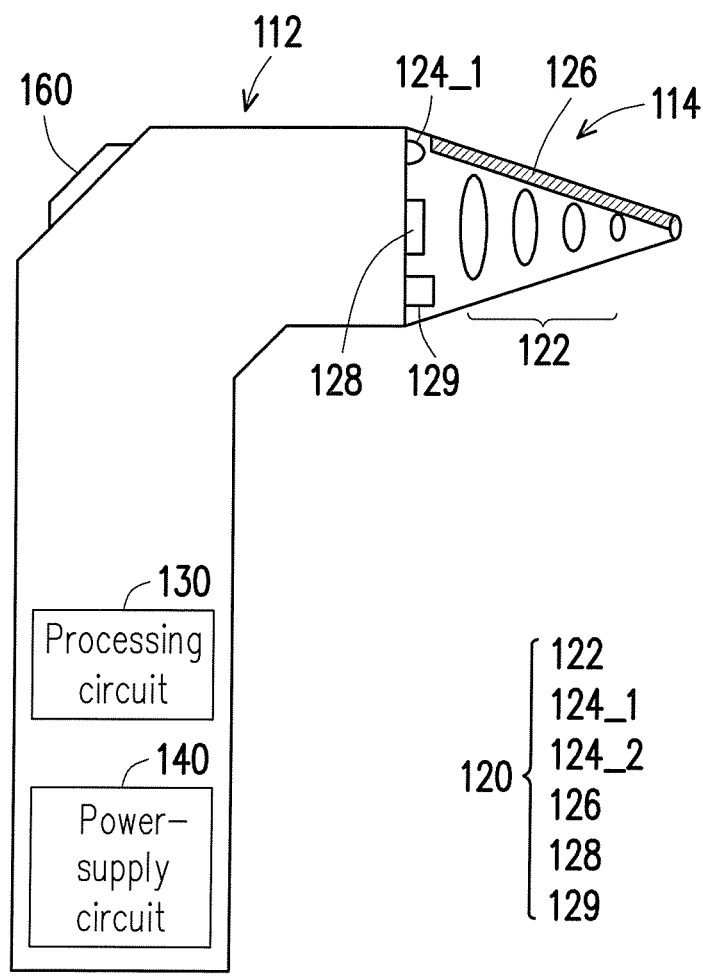
FIG. 3A is a schematic diagram of an internal structure configuration of the multi-focal length range image capturing device according to the embodiment of FIG. 1.
Figure 3B:
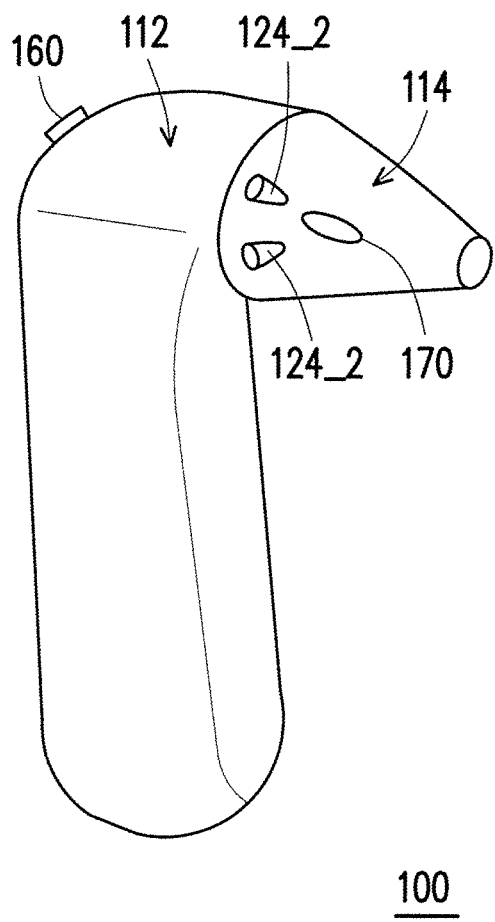
FIG. 3B is a schematic diagram of an external structure configuration of the multi-focal length range image capturing device according to the embodiment of FIG. 1.

FIG. 1 is a schematic block diagram of a multi-focal length range image capturing device according to an embodiment of the invention. FIG. 3A is a schematic diagram of an internal structure configuration of the multi-focal length range image capturing device according to the embodiment of FIG. 1. FIG. 3B is a schematic diagram of an external structure configuration of the multi-focal length range image capturing device according to the embodiment of FIG. 1. Herein, the present disclosure first introduces a multi-focal length range image capturing device 100 in an embodiment of the disclosure by FIG. 1, and then introduces all components and configuration relations in the multi-focal length range image capturing device 100 by FIG. 3A and FIG. B.

Referring to FIG. 1, in the present embodiment, the multi-focal length range image capturing device 100 includes a device body 110, an image capturing circuit 120, a processing circuit 130, a power-supply circuit 140, a display circuit 150, a shutter circuit 160 and a mode switch 170.

The image capturing circuit 120 is disposed in the device body 110 and configured to perform image capturing based on a focal length setting value FV and accordingly generate an image signal Simg.

The processing circuit 130 is coupled to the image capturing circuit 120 to control operations thereof, and configured to receive the image signal Simg generated by the image capturing circuit 120 for image signal processing and accordingly output an image IMG according to the image signal Simg. Said image signal processing may be (but not limited only to be), for example, signal sampling, noise filtering, grey level transformation and the like. Herein, the processing unit 130 may include, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices.

The power-supply circuit 140 is coupled to the image capturing circuit 120, the processing circuit 130, the display circuit 150 and the shutter circuit 160. The power-supply circuit 140 may be used to provide a working power PWR required for operating aforesaid circuits.

The display circuit 150 is coupled to the processing circuit 130 and the power-supply circuit 140, and configured to display the image IMG outputted by the processing circuit 130.

It should be noted that, the display circuit 150 of the present embodiment may be disposed in the multi-focal length range image capturing device 100 optionally. In other embodiments, the multi-focal length range image capturing device 100 may also include only the device body 110, the image capturing circuit 120, the processing circuit 130, the power-supply circuit 140 and the mode switch 150.

In the configuration where the multi-focal length range image capturing device 100 does not include the display circuit 150, the processing circuit 130 may output information associated with the image IMG to an external electronic device so as to display the image IMG by utilizing the external electronic device, but the invention is not limited thereto.

The shutter circuit 160 is coupled to the image capturing circuit 120, and configured to provide interface/button for the user to trigger. The shutter circuit 160 controls the image capturing circuit 120 to perform image capturing in response to the interface/button triggered/pressed by the user.

The mode switch 170 is disposed on the device body 110 and coupled to the processing circuit 130. The mode switch 170 may be a mechanical switch, an electronic switch, an electromagnetic switch or an optical switch. The mode switch 170 may be controlled to change a switching state thereof and generate a corresponding switch triggering signal STS in different types of the switching state for the processing circuit 130. For instance, when the mode switch 170 is switched to a first state (e.g., a first position in case of the mechanical switch; a turned off/open circuit state in case of the electronic switch; a sensed incident light amount that exceeds a preset value in case of the optical switch), the mode switch 170 can generate the switch triggering signal STS with a low level for the processing circuit 130. On the other hand, when the mode switch 170 is switched to a second state (e.g., a second position in case of the mechanical switch; a turned on/short circuit state in case of the electronic switch; the sensed incident light amount that is lower than the preset value in case of the optical switch), the mode switch 170 can generate the switch triggering signal STS with a high level for the processing circuit 130. However, the invention is not limited thereto.

Specifically, in the present embodiment, the processing circuit 130 can control the image capturing circuit 120 to switch between a plurality of image capturing modes according to the received switch triggering signal STS. The image capturing circuit 120 can switch a preset focal length range thereof in correspondence to different image capturing modes, so as to perform focusing operation in the corresponding preset focal length range.

Setting of the focal length range of a multi-focal length range image capturing device 100 of the present embodiment operated in the different image capturing modes is described below with reference to FIG. 2.

Figure 2:
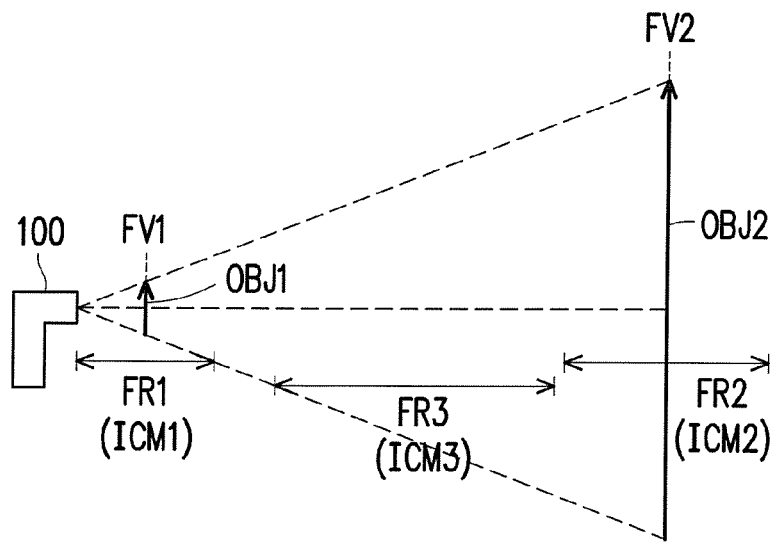
FIG. 2 is a schematic diagram of a focal length range of the multi-focal length range image capturing device operated in the different image capturing modes according to an embodiment of the invention.

Referring to FIG. 1 and FIG. 2 together, in the present embodiment, the multi-focal length range image capturing device 100 may be designed to at least include two different image capturing modes ICM1 and ICM2. When the image capturing circuit 120 is operated in the image capturing mode ICM1 according to the switch triggering signal STS, the image capturing circuit 120 sets a focal length range thereof to a preset focal length range FR1, so as to select the focal length setting value FV within the preset focal length range FR1. On the other hand, when the image capturing circuit 120 is operated in the image capturing mode ICM2 according to the switch triggering signal STS, the image capturing circuit 120 sets the focal length range to a preset focal length range FR2, so as to select the focal length setting value FV within the preset focal length range FR2.

In the present embodiment, the preset focal length ranges FR1 and FR2 are set to be focal length ranges not overlapped to each other but having a specific difference from each other. The preset focal length range FR1 may be, for example, 5 mm to 30 mm, and the preset focal length range FR2 may be, for example, 40 mm to 150 mm. In other words, tele-ends of the two preset focal length ranges FR1 and FR2 may have 5 times difference in term of focal length, but the invention is not limited thereto.

By setting the image capturing modes ICM1 and ICM2, the user is able to control the mode switch 170 based on capturing demands, so that the image capturing circuit 120 can start focusing with the focal length range closer to the object-end in order to reduce the time required for focusing.

For instance, as shown in FIG. 2, when an object OBJ1 within close distance is to be captured, the user can switch the mode switch 170 to the first state, so that the image capturing circuit 120 is operated in the image capturing mode ICM1. When the image capturing circuit 120 is switched to the image capturing mode ICM1, the image capturing circuit 120 switches the focal length setting value FV to a preset focal length value within the preset focal length range FR1, and starts focusing on the object OBJ1 by using the preset focal length value as an initial value for focusing (herein, the focusing operation may be auto focusing or manual focusing, which are not particularly limited by the invention). When a focal length value FV1 optimally matching the object OBJ1 within close distance is measured by the image capturing circuit 120, the image capturing circuit 120 uses such focal length value FV1 as the focal length setting value FV and accordingly perform operations of image capturing/shooting.

Similarly, when an object OBJ2 within remote distance is to be captured, the user can switch the mode switch 170 to the second state, so that the image capturing circuit 120 is operated in the image capturing mode ICM2. When the image capturing circuit 120 is switched to the image capturing mode ICM2, the image capturing circuit 120 switches the focal length setting value FV to a preset focal length value within the preset focal length range FR2, and starts focusing on the object OBJ2 by using the preset focal length value as the initial value for focusing. When a focal length value FV2 optimally matching the object OBJ2 within remote distance is measured by the image capturing circuit 120, the image capturing circuit 120 uses such focal length value FV2 as the focal length setting value FV and accordingly perform operations of image capturing/shooting.

Accordingly, regardless whether the object to be captured is within close range or remote range, the image capturing circuit 120 can start focusing with a rather suitable focal length range setting to quickly obtain the focal length setting value FV and accordingly perform image capturing, so as to satisfy demands in various capturing application scenarios and realize design of integrating different usages/types of image capturing together.

For instance, the multi-focal length range image capturing device 100 may serve as a combined-type physiological image capturing device which is capable of simultaneously achieving functions of otoscope for capturing in-ear images and laryngoscope for capturing oral cavity images. If the application of the multi-focal length range image capturing device 100 is for capturing in-ear images, the image capturing circuit 120 may be operated in the image capturing mode ICM1 in response to such application to focus on 5 to 30 mm at the front in order to clearly present in-ear images. If the application of the multi-focal length range image capturing device 100 is for capturing oral cavity images, the image capturing circuit 120 may be operated in the image capturing mode ICM2 in response to such application to focus on 40 to 150 mm at the front in order to clearly present parts in the oral cavity such as uvula, tonsil, velum and throat wall. However, the invention is not limited thereto.

Further, the mode switch 170 can switch the switching state in response to different application scenarios through a specific hardware configuration of the multi-focal length range image capturing device 100 (which will be described in more details in the following embodiments). Therefore, with said hardware configuration, the image capturing circuit 120 can automatically adjust the image capturing mode according to the switch triggering signal STS based on the different application scenarios so the user does not need to manually switch the mode switch 170. Accordingly, convenience in use of the multi-focal length range image capturing device 100 may be improved for the user.

Moreover, it is worth mentioning that, although the above description takes setting of the image capturing modes ICM2 and ICM2 for example, the invention is not limited thereto. As shown in FIG. 2, in an exemplary embodiment, three or more image capturing modes (e.g., image capturing modes ICM1, ICM2 and ICM3) may also be set for the multi-focal length range image capturing device 100 based on design considerations. Herein, a preset focal length range FR3 corresponding to the image capturing mode ICM3 may falls between the preset focal length ranges FR1 and FR2, for example. That is to say, a lower limit value of the preset focal length range FR3 is greater than a lower limit value of the preset focal length range FR1, and an upper limit value of the preset focal length range FR3 is less than an upper limit value of the preset focal length range FR2. Whether the preset focal length range FR3 is overlapped with the preset focal length ranges FR1 and FR2 is not limited in the present application, which may be designed to be overlapped or not overlapped with the preset focal length ranges FR1 and FR2 based on design requirements and is not particularly limited in the invention.

For instance, the image capturing mode ICM3 may be a mode used for capturing body surface images (e.g., skin images or eye images) of patient. Based on aforesaid setting, the preset focal length range FR3 may be, for example, 10 to 80 mm. Again, the invention is not limited thereto.

Furthermore, in the case where the multi-focal length range image capturing device 100 is designed to include three (or more) image capturing modes ICM1 to ICM3, the mode switch 170 may be correspondingly configured to include the switching state having at least three different bit-order variations, so that the mode switch 170 can transmit the corresponding switch triggering signal STS in response to the different types of the switching state. In such application, the switch triggering signal may be realized by utilizing signals in form of two bits or multiple bits to at least indicate three different types of the switching state. For instance, the switch triggering signal STS may utilize different bit combinations including "01", "10" and "11" to respectively indicate the types of the switching state corresponding to the image capturing modes ICM1 to ICM3. Again, the invention is not limited thereto.

An exemplary example for the hardware configuration of the multi-focal length range image capturing device 100 is further described below, as shown by FIG. 3A and FIG. 3B. FIG. 3A is a schematic diagram of an internal structure configuration of the multi-focal length range image capturing device according to the embodiment of FIG. 1. FIG. 3B is a schematic diagram of an external structure configuration of the multi-focal length range image capturing device according to the embodiment of FIG. 1.

In the present embodiment, the device body 110 includes a grip portion 112 and a probe portion 114. The image capturing circuit 120 includes a lens set 122, light sources 124_1 and 124_2, a light guiding unit 126, an image sensor 128 and a focal length adjusting unit 129.

From the perspective of the hardware configuration, the grip portion 112 and the probe portion 114 may be, for example, a housing having an accommodating space therein.

The grip portion 112 may serve as a handle of the multi-focal length range image capturing device 100 for the user to hold during operations.

The probe portion 114 is in form of cone, in which one end with smaller radius is defined as a front end of the probe portion 114, and one end with greater radius is defined as a rear end of the probe portion 114. The rear end of the probe portion 114 connects to the grip portion 112. The front end of the probe portion 114 is adapted to be placed inside the human body such as ear cavity, oral cavity, nose cavity and the like, so that the image capturing circuit 120 is able to capture images inside the human body.

From the perspective of the internal configuration of the multi-focal length range image capturing device 100, as shown in FIG. 3A, the lens set 122 is disposed on the front end of the probe portion 114, and configured to collect light and provide light to the image sensor 128 disposed on a light traveling path TP thereof. As such, the image sensor 128 can sense a light intensity and converts the light intensity into the image signal Simg in form of electrical signal. The image sensor 128 of the present embodiment may include, for example, an optical sensing element. The optical sensing element may be, for example, a charge coupled device (CCD), a complementary metal-oxide semiconductor (CMOS) device or other similar devices, but the invention is not limited thereto.

The light source 124_1 may be disposed inside the grip portion 112 or the probe portion 114. The light guiding unit 126 is disposed in the probe portion 114. The light guiding unit 126 is configured to provide a light conduction path located between the front end and the rear end of the probe portion 114. In the present embodiment, the light guiding unit 126 may be implemented by utilizing an optical fiber bundle, but the invention is not limited thereto.

More specifically, one end of the light guiding unit 126 is disposed corresponding to a location of the light source 124_1, and another end of the light guiding unit 180 extends to the front end of the probe portion 114. Accordingly, light from the light source 111 may pass through the light conduction path provided by the light guiding unit 126 to be emitted from the front end of the probe portion 114. Herein, the light source 124_1 may be implemented by a light emitting diode, but the invention is not limited thereto. Further, a method for disposing the light guiding unit 126 inside the probe portion 114 may include, for example, attaching the light guiding unit 126 around an inner surface of the probe portion 114, but the invention is not limited thereto.

The focal length adjusting unit 129 is disposed inside the grip portion 112 or the probe portion 114, and controlled by the processing circuit 130 to adjust a focal length of the lens set 122, so as to adjust the focal length of the lens sets 122 to the corresponding preset focal length range in the different image capturing modes. In practical applications, said focal length adjusting unit 129 may be, for example, a voice coil motor (VCM) driver, but the invention is not limited thereto.

The processing circuit 130 and the power-supply circuit 140 may be disposed inside the accommodating space of the grip portion 112, and connected to each component of the image capturing circuit 120 through wires, so as to receive the image signal Simg or control operations of other components.

The shutter circuit 160 (hereinafter, also known as "shutter button 160") may be implemented by a button and disposed on the grip portion 112. The user may control the image capturing circuit 120 to perform the operations of image capturing and auto focusing by pressing the shutter button 160.

On the other hand, from the perspective of the external structure configuration of the multi-focal length range image capturing device 100, as shown in FIG. 3B, the light source 124_2 is disposed outside the grip portion 122 or the probe portion 114. The two light sources 124_2 as depicted in the drawing are only an example, and the invention is not intended to limit a quantity of the light source 124_2.

In a physiological image capturing application, for hygiene considerations, the multi-focal length range image capturing device 100 may combine use of different types of probe cover caps (e.g., an otoscope cover cap or a laryngoscope cover cap, etc.) according to application demands of the user. The probe cover cap is generally in form of cone corresponding to the probe portion 114 in order to facilitate setting the probe cover cap onto the probe portion 114. Herein, the different types of the probe cover caps have different sizes. For instance, in the application for capturing in-ear images, the user may set an otoscope cover cap onto the probe portion 114; and in the application for capturing oral cavity images, the user may set a laryngoscope cover cap onto the probe portion 114 instead.

The mode switch 170 is disposed outside the probe portion 114, and located on a location where the probe cover cap of a specific type is set onto the probe portion 114 (which will be described later in the following embodiments). The mode switch 170 is switched when the probe cover cap of the specific type is set onto the probe portion 114 so that the image capturing mode may be changed according to the different types of the probe cover caps being set.

In addition, in the image capturing circuit 120, the light sources 124_1 and 124_2 can be selectively turned on or turned off in the different image capturing modes in response to the switching state of the mode switch 170, so as to provide illumination required for image capturing in different application scenarios.

Figure 4:
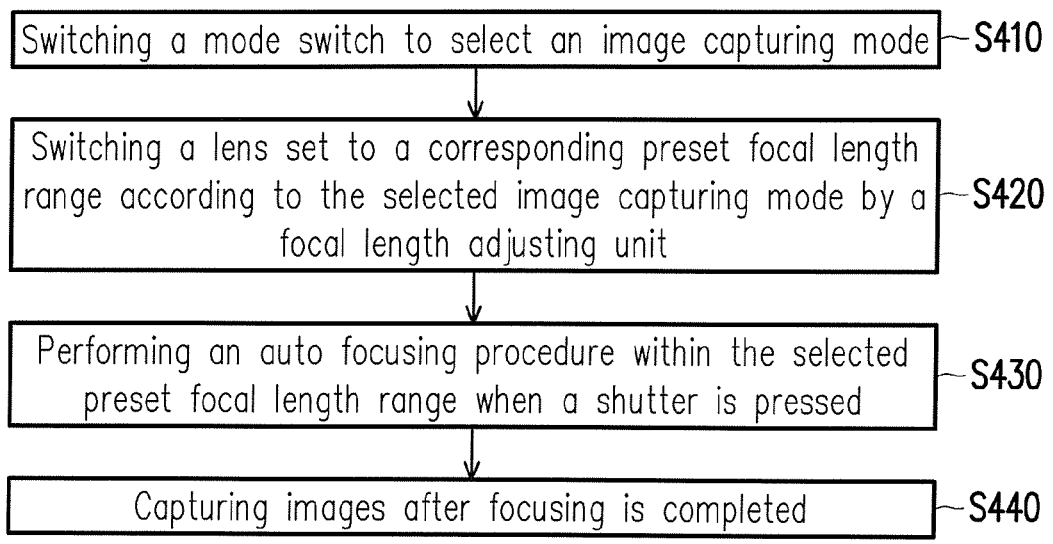
FIG. 4 is a flowchart of steps for operating a multi-focal length range image capturing device according to an embodiment of the invention.
Figure 5:
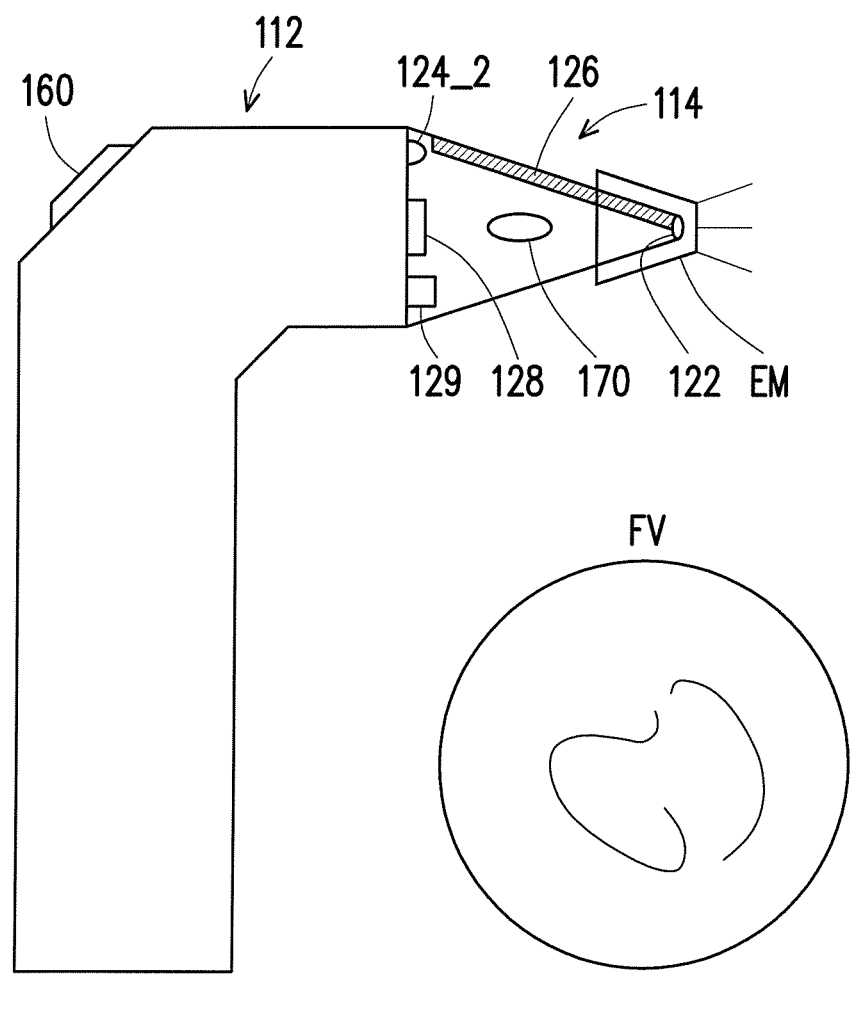
FIG. 5 is a schematic diagram for using a multi-focal length range image capturing device according to an embodiment of the invention.
Figure 6:
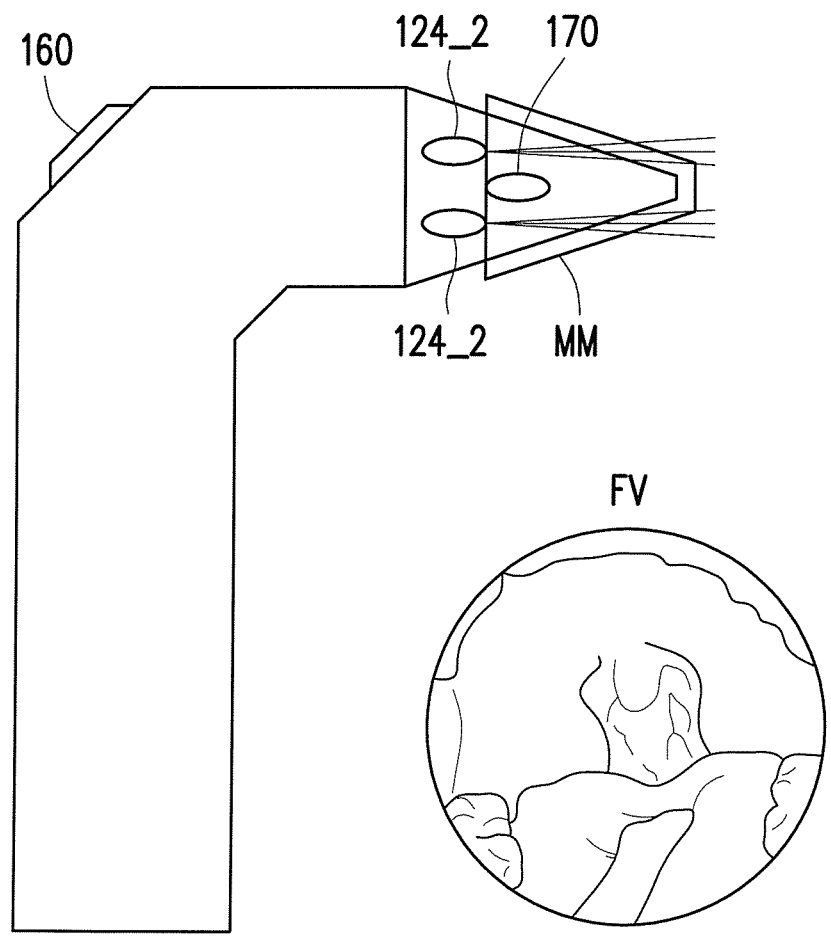
FIG. 6 is a schematic diagram for using a multi-focal length range image capturing device according to another embodiment of the invention.

Specific operating processes of the image capturing device 100 are described in more details with reference to the embodiment of FIG. 4 below, and specific configuration and operating method of the image capturing device 100 in different modes are further described with reference to the embodiments of FIG. 5 and FIG. 6 below. FIG. 4 is a flowchart of steps for operating a multi-focal length range image capturing device according to an embodiment of the invention. FIG. 5 is a schematic diagram for using a multi-focal length range image capturing device according to an embodiment of the invention. FIG. 6 is a schematic diagram for using a multi-focal length range image capturing device according to another embodiment of the invention.

First, referring to FIG. 4, when the user intends to use a multi-focal length range image capturing device 100, a mode switch must first be switched to select an image capturing mode (step S410). After the image capturing mode is selected, the focal length adjusting unit 129 switches the lens set 122 to a corresponding preset focal length range according to the selected image capturing mode (step S420). Thereafter, the focal length adjusting unit 129 can perform an auto focusing procedure within the selected preset focal length range when a shutter is pressed by the user (step S430), and captures images after focusing is completed (step S440).

More specifically, referring to FIG. 5, when the user intends to use the multi-focal length range image capturing device 100 as the otoscope for capturing in-ear images, the user may set an otoscope cover cap EM onto the probe portion 114. It is assumed that the switching state of the mode switch 170 is set to the first state by default, and the otoscope cover cap EM is not in contact with the mode switch 170 based on the configuration of the present embodiment. Accordingly, after the multi-focal length range image capturing device 100 is activated, the image capturing circuit 120 is operated in the image capturing mode ICM1 in response to the switch triggering signal STS indicating the first state. Herein, in the image capturing mode ICM1, the focal length adjusting unit 129 sets the focal length range to be within the preset focal length range FR1 of 11 mm to 25 mm, and the light source 124_1 is turned on in response to the switch triggering signal STS indicating the first state while the light source 124_2 is turned off correspondingly. At the time, an illuminating ray is provided from the front end of the probe portion 114.

When the user intends to capture an in-ear image E_IMG, the user may control the image capturing circuit 120 to perform the focusing operation by half-pressing the shutter button 160. In the image capturing mode ICM1, the focal length adjusting unit 129 adjusts the focal length of the lens set 122 within the preset focal length range FR1, so as to obtain the focal length setting value FV required for capturing the in-ear image E_IMG.

After the focusing is completed, the user can control the image capturing circuit 120 to capture the image by full-pressing the shutter button 160. Meanwhile, the image sensor 128 can capture the light within in-ear environment collected by the lens set 122 and accordingly generate the corresponding image signal Simg. The image signal Simg is transmitted to the processing circuit 130 for image processing in order to output the in-ear image E_IMG.

Referring to FIG. 6, when the user intends to use the multi-focal length range image capturing device 100 as the laryngoscope for capturing oral cavity images, the user may set a laryngoscope cover cap MM onto the probe portion 114. At this time, because the mode switch 170 is in contact with the laryngoscope cover cap MM being set onto the probe portion 114, the switching state of the mode switch 170 is switched to the second state. Accordingly, the image capturing circuit 120 is operated in the image capturing mode ICM2 at the time in response to the switch triggering signal STS indicating the second state. Herein, in the image capturing mode ICM2, the focal length adjusting unit 129 sets the focal length range to be within the preset focal length range FR2 of 50 mm to 100 mm, and the light source 124_2 is turned on in response to the switch triggering signal STS indicating the second state while the light source 124_1 is turned off correspondingly. At the time, an illuminating ray is provided from the outside of the probe portion.

As similar to the operations in the foregoing embodiment, when the user intends to capture an oral cavity image M_IMG, the user may control the image capturing circuit 120 to perform the focusing operation by half-pressing the shutter button 160. In the image capturing mode ICM2, the focal length adjusting unit 129 adjusts the focal length of the lens set 122 within the preset focal length range FR2, so as to obtain the focal length setting value FV required for capturing the oral cavity image M_IMG.

After the focusing is completed, the user can control the image capturing circuit 120 to capture the image by full-pressing the shutter button 160. Meanwhile, the image sensor 128 can capture the light within in-ear environment collected by the lens set 122 and accordingly generate the corresponding image signal Simg. The image signal Simg is transmitted to the processing circuit 130 for image processing in order to output the oral cavity image M_IMG.

Based on the above, the present embodiment is capable of integrating the functions of image capturing for different parts of the human body (e.g., in-ear, skin, eye, oral cavity, etc.) into one single device. As such, the user no longer need to use different endoscopes for capturing images from different parts of the human body, such that the convenience in use may be improved for the user accordingly.

Figure 7:
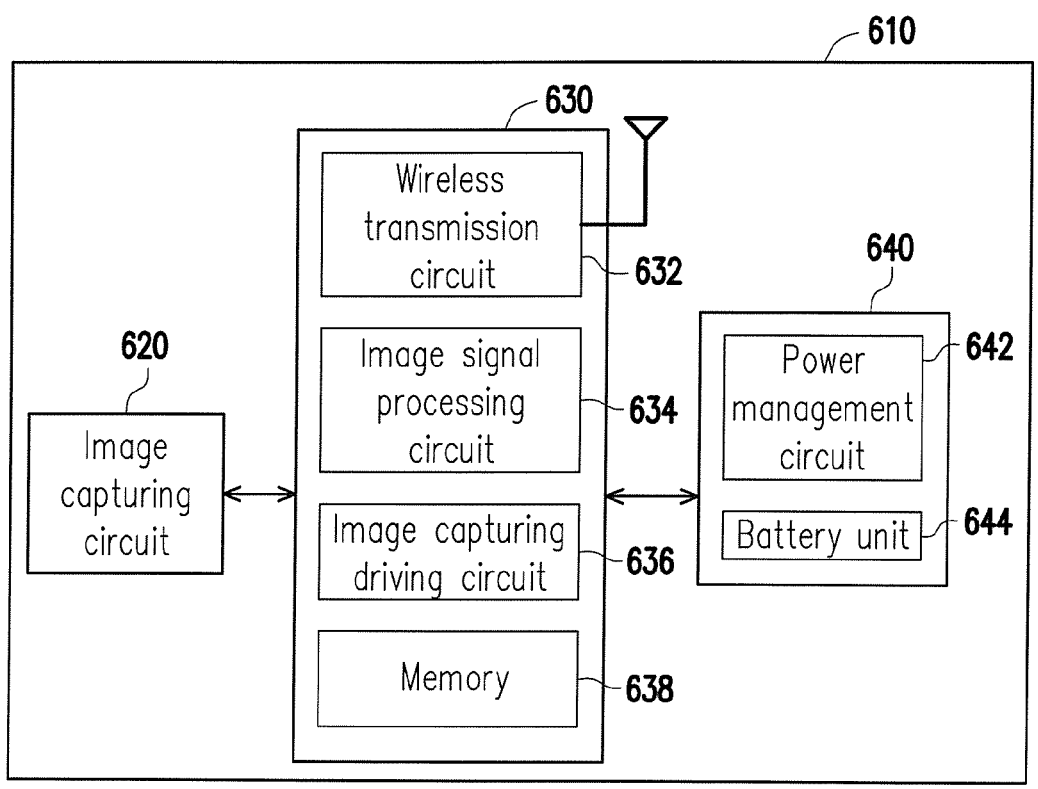
FIG. 7 is a schematic diagram for configuring circuit function blocks of a multi-focal length range image capturing device according to an embodiment of the invention.

A circuit configuration of the multi-focal length range image capturing device of the present disclosure is described below with reference to FIG. 7. FIG. 7 is a schematic diagram for configuring circuit function blocks of a combined-type image capturing device according to an embodiment of the invention.

Referring to FIG. 7, a multi-focal length range image capturing device 600 of the present embodiment includes a device body 610, an image capturing circuit 620, a processing circuit 630 and a power-supply circuit 640. Herein, a circuit configuration of the image capturing circuit 610 may be similar to those described in the foregoing embodiments in FIG. 1 to FIG. 5. The processing circuit 630 includes a wireless transmission circuit 632, an image signal processing circuit 634, an image capturing driving circuit 636 and a memory 638. The power-supply circuit 640 includes a power management circuit 642 and a battery unit 644.

In the processing circuit 630, the image capturing driving circuit 632 may be used to drive the image capturing circuit 620 so that the image capturing circuit 620 can transmit the image Simg in return. The image signal processing circuit 634 can receive image signal Simg and read necessary information from the memory 638 to perform signal processing for the image signal Simg, so as to generate the image IMG.

Herein, the image IMG generated by the image signal processing circuit 634 may be transmitted to an external electronic device via the wireless transmission circuit 632 so that the user can view the image though the external electronic device.

In the power-supply circuit 640, the power management circuit 642 is configured to modulate a charging/discharging behavior of the battery unit 644, so as to control the working power PWR provided to each of the circuits.

In summary, the invention proposes a multi-focal length range image capturing device. The user can easily realize the image capturing in various focal length ranges based on requirements of the application scenarios simply by using one single device. Accordingly, the user no longer need to use different hardware devices (e.g., otoscope and laryngoscope) for capturing the internal images from different parts of the human body, such that the convenience in use of capturing the internal images of the human body may be improved for the user accordingly. Further, the switching state of the mode switch of the present application can be switched in response to different application scenarios through the specific hardware configuration of the multi-focal length range image capturing device. Therefore, the image capturing circuit can automatically adjust the image capturing mode according to the switch triggering signal indicating the different types of the switching state based on the different application scenarios. As a result, the user no longer need to additionally and manually switch the mode switch, so that convenience in use of the multi-focal length range image capturing device may be improved for the user and the multi-focal length range image capturing device may also be widely applied in general household more easily.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A multi-focal length range image capturing device, comprising:
   a device body, having a probe portion;
   an image capturing circuit, disposed in the device body, and configured to perform image capturing based on a focal length setting value and accordingly generate an image signal;
   a processing circuit, disposed in the device body, coupled to the image capturing circuit, and configured to control operations of the image capturing circuit so as to output an image according to the image signal; and
   a mode switch, disposed on the device body, coupled to the processing circuit, and configured to generate a switch triggering signal according to a switching state of the mode switch,
   wherein the processing circuit controls the image capturing circuit to be operated in one of a plurality of image capturing modes according to the switch triggering signal,
   wherein the image capturing circuit sets a focal length range thereof to a first preset focal length range to select the focal length setting value within the first preset focal length range when the image capturing circuit is operated in a first image capturing mode among the image capturing modes according to the switch triggering signal, and
   the image capturing circuit sets the focal length range to a second preset focal length range to select the focal length setting value within the second preset focal length range when the image capturing circuit is operated in a second image capturing mode among the image capturing modes according to the switch triggering signal,
   wherein the mode switch is disposed on the probe portion, the mode switch is switched to a first state when a first-type probe cover cap is set onto the probe portion, and the mode switch is switched to a second state when a second-type probe cover cap is set onto the probe portion.

2. The multi-focal length range image capturing device of claim 1, wherein the mode switch is one of a mechanical switch, an electronic switch, an electromagnetic switch and an optical switch.

3. The multi-focal length range image capturing device of claim 1, wherein the device body has a grip portion, and the probe portion is adapted to fit with a plurality of different types of probe cover caps.

4. The multi-focal length range image capturing device of claim 1, wherein the image capturing circuit is switched to the first image capturing mode in response to the switch triggering signal corresponding to the first state, and is switched to the second image capturing mode in response to the switch triggering signal corresponding to the second state.

5. The multi-focal length range image capturing device of claim 1, wherein the image capturing circuit comprises:
   a lens set, disposed on the probe portion;
   a first light source, disposed inside the device body;
   a second light source, disposed outside the device body;
   a light guiding unit, disposed inside the probe portion, located between the first light source and the lens set, and configured to provide a light conduction path;
   an image sensor, disposed on a light traveling path of the lens set, and configured to generate the image signal; and
   a focal length adjusting unit, controlled by the processing circuit to adjust a focal length of the lens set.

6. The multi-focal length range image capturing device of claim 5, wherein the first light source is enabled in response to the switch triggering signal and the second light source is disabled in response to the switch triggering signal when the image capturing circuit is operated in the first image capturing mode, and the second light source is enabled in response to the switch triggering signal and the first light source is disabled in response to the switch triggering signal when the image capturing circuit is operated in the second image capturing mode.

7. The multi-focal length range image capturing device of claim 1, wherein the first preset focal length range and the second preset focal length range are not overlapped with each other.

8. The multi-focal length range image capturing device of claim 7, wherein the first preset focal length range is 5 mm to 30 mm, and the second preset focal length range is 40 mm to 150 mm.

9. The multi-focal length range image capturing device of claim 7, wherein the image capturing circuit sets the focal length range to a third preset focal length range to select the focal length setting value within the third preset focal length range when the image capturing circuit is operated in a third image capturing mode among the image capturing modes according to the switch triggering signal, wherein the third preset focal length range falls between the first and the second preset focal length ranges.

10. The multi-focal length range image capturing device of claim 9, wherein the third preset focal length range is 10 mm to 80 mm.

11. The multi-focal length range image capturing device of claim 1, further comprising:
   a power-supply circuit, coupled to the image capturing circuit and the processing circuit, and configured to provide a working power required for operating the image capturing circuit and the processing circuit; and
   a display circuit, coupled to the processing circuit and the power-supply circuit, and configured to display the image.

12. The multi-focal length range image capturing device of claim 1, further comprising:
   a shutter circuit, coupled to the image capturing circuit, and triggered to control the image capturing circuit to perform image capturing.

* * * * *